(12) United States Patent
Serstad et al.

(10) Patent No.: US 12,741,298 B2
(45) Date of Patent: Sep. 22, 2026

(54) SEQUENCING PARCEL SORTER

(71) Applicant: Tompkins Robotics, Inc., Orlando, FL (US)

(72) Inventors: James M. Serstad, Orlando, FL (US); Michael C. Futch, Cocoa, FL (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

(21) Appl. No.: 19/175,006

(22) Filed: Apr. 10, 2025

(65) Prior Publication Data

US 2025/0235897 A1 Jul. 24, 2025

Related U.S. Application Data

(63) Continuation of application No. 17/678,545, filed on Feb. 23, 2022, now Pat. No. 12,280,401, which is a (Continued)

(51) Int. Cl.
*B07C 3/00* (2006.01)
*G05D 1/00* (2006.01)
(Continued)

(52) U.S. Cl.
CPC ........... *B07C 3/006* (2013.01); *G05D 1/0212* (2013.01); *G05D 1/43* (2024.01); *G06Q 10/08* (2013.01)

(58) Field of Classification Search
CPC ....... B07C 3/006; G05D 1/0212; G06Q 10/08
See application file for complete search history.

(56) References Cited

U.S. PATENT DOCUMENTS 3,759,381 A 9/1973 Mercadie
3,880,298 A 4/1975 Habegger et al.
(Continued)

FOREIGN PATENT DOCUMENTS

KR 10-1869896 B1 6/2018

OTHER PUBLICATIONS

ISA/KR; International Search Report and Written Opinion for International Patent Application No. PCT/US20/46940 dated Nov. 27, 2020, 11pages.
(Continued)

*Primary Examiner* — Kyle O Logan
(74) *Attorney, Agent, or Firm* — Parthiban A Mathavan

(57) ABSTRACT

Method of sorting articles to a plurality of delivery routes includes sequencing a plurality of delivery stops within each of a plurality of routes based on a predefined criterion, and, depositing articles associated with a first delivery stop of each route in a first sequence container. The method also includes transferring articles from the first sequence container to a respective route container of a plurality of route containers, each route container associated with a route, depositing articles associated with a second delivery stop of each route in a second sequence container, and, transferring articles from the second sequence container to the respective route container of the plurality of route containers. Transferring articles from the second sequence container commences after completion of transferring articles from the first sequence container.

20 Claims, 13 Drawing Sheets

Related U.S. Application Data continuation of application No. PCT/US2020/046940, filed on Aug. 19, 2020.

(60) Provisional application No. 62/892,575, filed on Aug. 28, 2019.

(51) Int. Cl.
*G05D 1/43* (2024.01)
*G06Q 10/08* (2023.01)

(56) References Cited

U.S. PATENT DOCUMENTS 4,690,283 A 9/1987 Carrell
5,042,667 A * 8/1991 Keough .................... B07C 3/00 209/584
6,005,211 A 12/1999 Huang et al.
6,323,452 B1 11/2001 Bonnet
6,702,121 B2 3/2004 Linge et al.
6,762,382 B1 7/2004 Danelski
9,975,148 B2 5/2018 Zhu et al.
2003/0155282 A1* 8/2003 Kechel ...................... B07C 3/00 209/584
2009/0223877 A1* 9/2009 Karnin ...................... B07C 3/00 209/552
2011/0125664 A1 5/2011 Kadaba
2015/0081088 A1 3/2015 Lyon et al.
2015/0088886 A1 3/2015 Brouwer, II et al.
2017/0182158 A1 6/2017 Lake et al.
2017/0183158 A1* 6/2017 Zhu ........................... B07C 3/02
2019/0105687 A1* 4/2019 Bombaugh ............... B07C 3/10
2019/0377360 A1* 12/2019 Kim ........................ H04W 4/44

OTHER PUBLICATIONS

WIPO; International Preliminary Report on Patentability for International Patent Application No. PCT/US2020/046940 dated Mar. 10, 2022, 7pages.

* cited by examiner

SEQUENCING PARCEL SORTER

CROSS-REFERENCE TO RELATED APPLICATIONS

This application is a continuation of International Patent Application No. PCT/US20/46940 filed on Aug. 19, 2020, which claims priority to U.S. Provisional Patent Application 62/892,575 filed on Aug. 28, 2019, the entire contents of which are all hereby incorporated herein by reference.

TECHNICAL FIELD

The present invention relates to a material handling technology and in particular to a system and method for sorting articles.

BACKGROUND

Logistics companies manage sorting and delivery of articles to several destinations located along various delivery routes on a daily basis. The sorting and delivery operation typically involves a sorting center receiving articles from several locations, where the articles get sorted and dispatched for delivery through delivery vehicles. Last mile delivery is the movement of articles from a transportation/dispatch hub to a final delivery destination. The final delivery destination is typically a personal residence. The focus of last mile logistics is to deliver an article to the end user as fast as possible. However, existing methods often include inefficiencies in the delivery process. For example, a delivery route driver typically spends a considerable amount of time in organizing all articles to be delivered along a given route by the delivery sequence for each of those articles.

A need exists for improving efficiencies associated with sorting and delivering of articles, particularly during the last mile delivery phase.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a control system configured for use with sorting articles to a plurality of delivery routes. The control system comprises a memory and a processor. The control system configured for: sequencing a plurality of delivery stops within each of a plurality of routes based on a predefined criterion; directing transport of articles associated with a first delivery stop of each route to a first sequence container; directing transport of articles from the first sequence container to a respective route container of a plurality of route containers, each route container associated with a route; directing transport of articles associated with a second delivery stop of each route to a second sequence container; directing transport of articles from the second sequence container to the respective route container of the plurality of route containers, the transport of articles from the second sequence container commencing after completion of the transport of articles from the first sequence container.

Disclosed herein is a control system configured for use with sorting articles to a plurality of delivery routes. The control system comprising a memory and a processor. The control system configured for: sequencing a plurality of delivery stops within each of a plurality of routes based on a predefined criterion; directing transport of articles associated with a first delivery stop of each route to a first sequence container; directing transport of articles from the first sequence container to a respective route container of a plurality of route containers, each route container associated with a route; directing transport of articles associated with a second delivery stop of each route to a second sequence container; directing transport of articles from the second sequence container to the respective route container of the plurality of route containers, the transport of articles from the second sequence container commencing after completion of the transport of articles from the first sequence container. The transport is performed by one or more of: a tilt tray sorter, a cross-belt sorter, a bomb-bay sorter, a pop-up sorter, a pusher sorter, a linear arm sorter, a pocket sorter, a narrow-belt sorter, an activated roller-belt sorter, mail sorter, shoe sorter, Trap arm sorter, STV loop sorter, paddle sorter, pivot wheel sorter.

Disclosed herein is a method of sorting articles to a plurality of delivery routes. The method comprises: sequencing a plurality of delivery stops within each of a plurality of routes based on a predefined criterion; depositing articles associated with a first delivery stop of each route in a first sequence container; transferring articles from the first sequence container to a respective route container of a plurality of route containers, each route container associated with a route; depositing articles associated with a second delivery stop of each route in a second sequence container; and transferring articles from the second sequence container to the respective route container of the plurality of route containers, transferring articles from the second sequence container commencing after completion of transferring articles from the first sequence container.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION OF EMBODIMENTS

Figure 1:
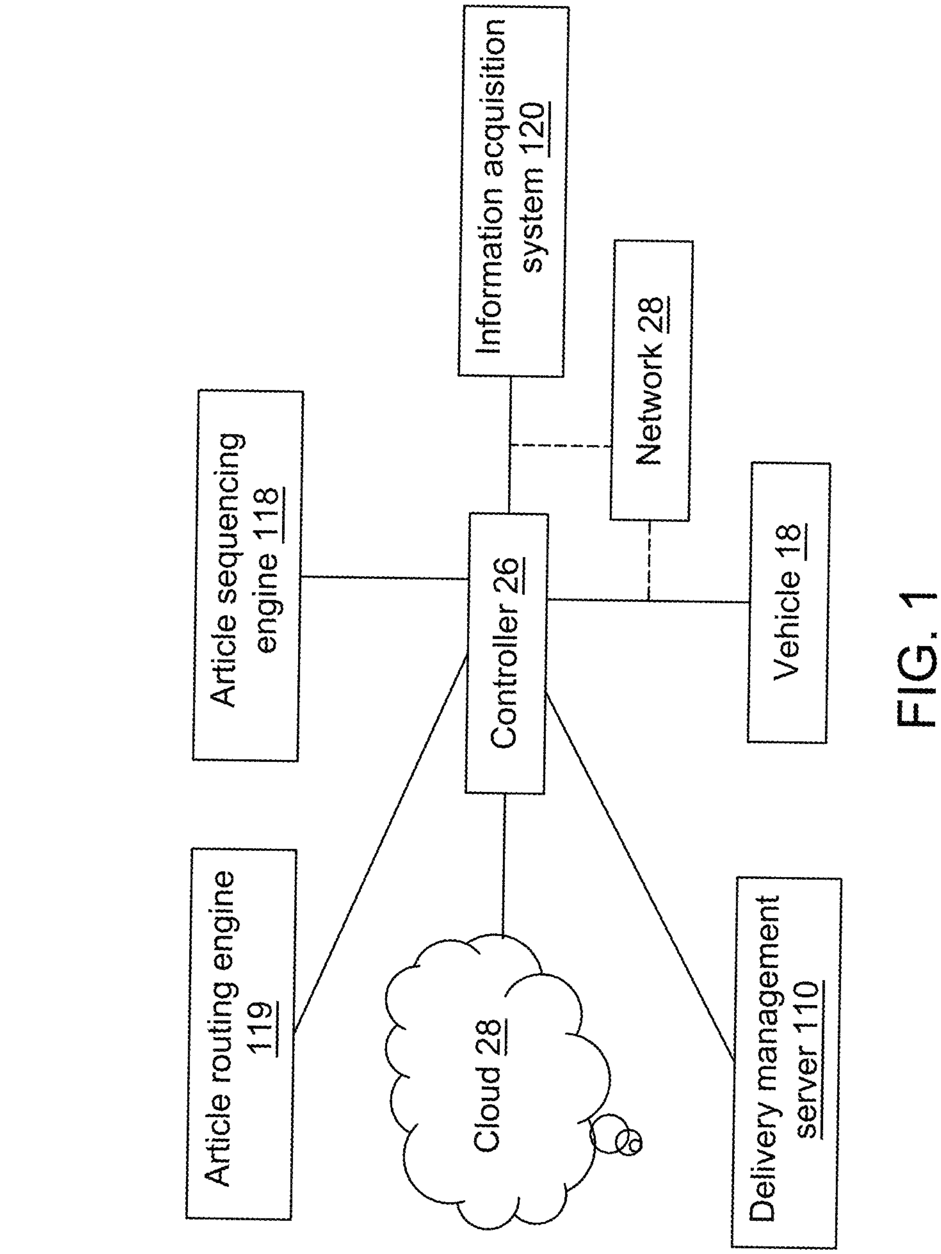
FIG. 1 is a schematic block diagram of a delivery control system, according to the present invention.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The invention will now we described with reference to the Figures shown below.

During the last mile delivery phase of the sorting and delivery operations, the driver's efficiency can be critical. Last-mile delivery providers often use route optimization software that allows them to optimize resources allocated for the delivery of articles along a given route. When articles are received at the last-mile hub, the hub may also receive a file or database of all the delivery addresses for the articles. From this data, articles can be assigned to various routes as determined by route assignment software. The last-mile delivery provider may use this data to sort the articles to their routes, and label each article with a human-readable label to allow for the driver of the delivery vehicle or another individual to manually sort the articles into a delivery sequence. However, such manual sorting by delivery sequence can add cost and time to the last mile delivery phase.

Embodiments disclosed herein can advantageously overcome limitations in the art by allowing for the elimination of manual sortation of articles according to the delivery sequence. Embodiments disclosed herein can include a control system configured for use with sorting articles with computer-controlled transport vehicles to a plurality of delivery routes, the control system comprising a memory and a processor. The control system can be configured for sequencing a plurality of delivery stops within each of a plurality of routes based on one or more predefined criteria. The control system can be further configured to direct transport of articles associated with a first delivery stop of each route to a first sequence container. The control system can be also configured to direct transport of articles from the first sequence container to a respective route container of a plurality of route containers, each route container associated with a route. The control system can be additionally configured to direct transport of articles associated with a second delivery stop of each route to a second sequence container. The control system can be furthermore configured to direct transport of articles from the second sequence container to the respective route container of the plurality of route containers, the transport of articles from the second sequence container commencing after completion of the transport of articles from the first sequence container. The transport can be performed by computer-controlled transport vehicles controlled by the control system. Herein, the term article as used herein includes a package, a parcel, a mail element, a mail item, or any tangible item that is to be delivered to a destination address after being sorted at a processing facility.

The system as described herein is accordingly configured for sorting a plurality of articles by the sequence in which each article is to be delivered to thereby reduce one or more of the cost and time associated with the delivery of all articles assigned to be delivered along a specific route. By automating the sequencing of the articles, the system as described herein can provide significant efficiency gain for the delivery vehicle drivers that may otherwise have to manually perform such function.

FIG. 1 illustrates a delivery control system 100 (alternately referred to herein as "system 100" or generally as "system") according to one or more embodiments disclosed herein. System 100 includes various components, some of which are depicted in a representative manner as blocks representing a generic descriptor of the technology. The system 100 may include more or less components than those illustrated. In one embodiment, system 100 includes a controller 26 and a delivery management server 110 configured for communicating with one or more components of system 100 as described herein, and as shown, for example, in FIG. 1. In one embodiment, delivery management server 110 includes memory, a processor, and/or one or more communication interfaces. A network 29 is illustrated by lines and arrows connecting the blocks; the network may take on any appropriate form, including a wireless, WLAN, cellular, hard wire, etc., and combinations thereof.

Delivery management server 110 (alternately referred to as "server 110" or generally as "server") communicates over network 29 with a cloud infrastructure such as cloud 28. Similarly, several of the components such as, for example, article routing engine 119, article sequencing engine 118, information acquisition system 120, vehicle 18, and controller 26, among others, may communicate over network with cloud 28. In some embodiments one or more components of system 100 may reside in cloud 28. For example, in one embodiment, one or more of delivery management server 110, article routing engine 119, article sequencing engine 118, information acquisition system 120, and controller 26, among others may reside in cloud 28. In a further example, only delivery management server 110, article routing engine 119 and article sequencing engine 118 may reside in cloud 28.

FIG. 1 illustrates controller 26 being in communication with cloud 28 by way of a continuous line; however, one or more other components of system 100 too may be in communication with cloud 28 (the additional continuous lines have been omitted in FIG. 1 for the sake of clarity. Further, each of the components shown in FIG. 1 may be in communication with one or more other components through network 29. For example, cloud 28 and controller 26 may further communicate with an article sequencing engine 118, an article routing engine 119, one or more computer-controlled transport vehicles 18 (alternately referred to simply as "vehicles 18"), and with an information acquisition system 120. In one embodiment, information acquisition system 120 is configured for imaging or otherwise interrogating an image or other identifier of an article to determine a destination thereof. System 100—in conjunction with delivery management server 110, article sequencing engine 118, and article routing engine 119, among others—may then sort and use a plurality of vehicles 18 to deposit the articles into appropriate bins, chutes or containers marked for specific routes in or outside of a local market. In one embodiment, information acquisition system 120 can be in communication with one or more of controller 26 and delivery management server 110.

In one embodiment, system 100 is supplied with a relational database listing various sets of features to be considered by a real time optimization algorithms operating on delivery management server 110, article sequencing engine 118 and article routing engine 119 for purposes of optimizing delivery of the articles. The relational database may include, among others, information such as delivery address, delivery stop, delivery route, and delivery preferences, associated with each article.

Figure 2:
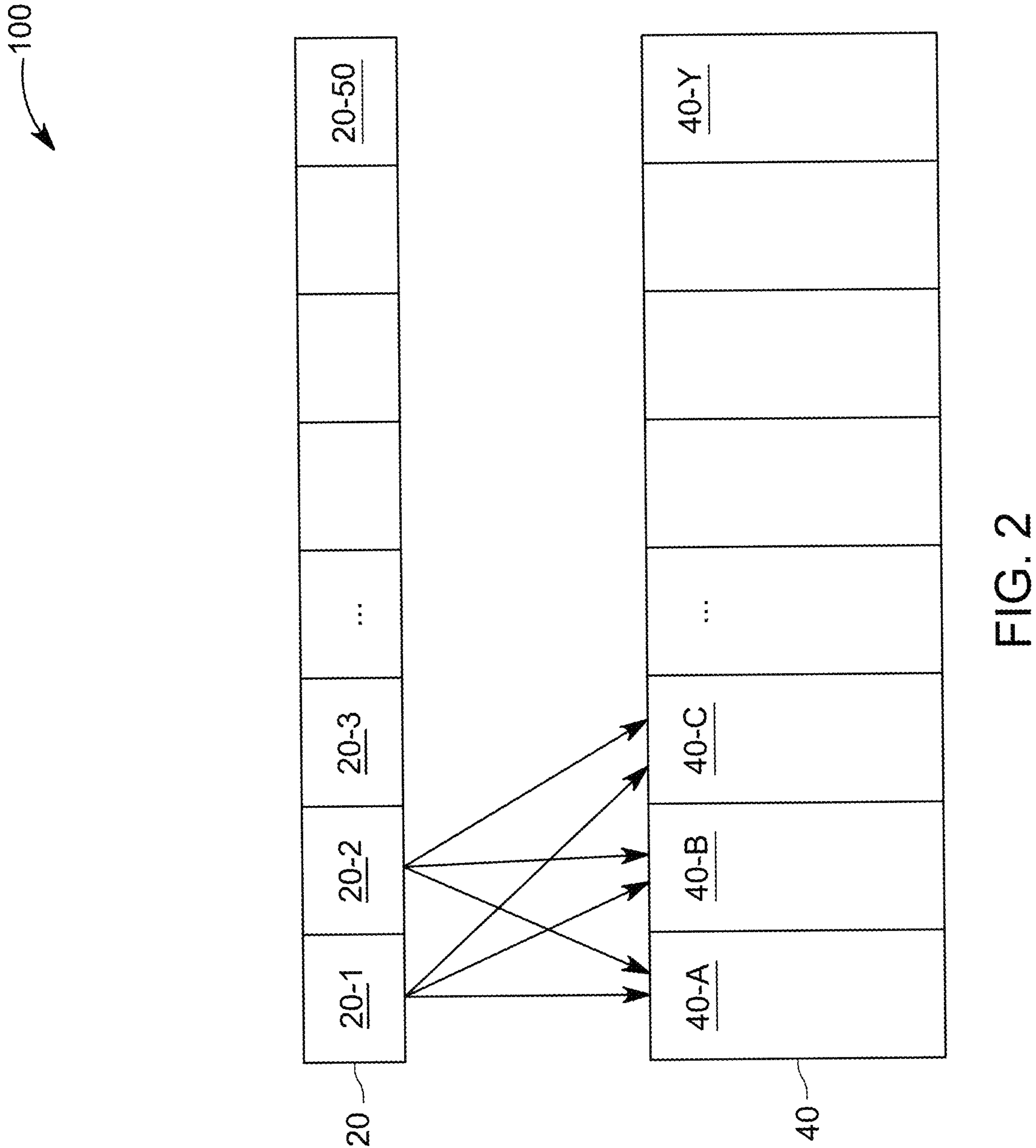
FIG. 2 is a schematic structural diagram of an embodiment of a delivery control system including sequencing sort containers and route containers, according to the present invention.

As shown in FIG. 2, in one embodiment, system 100 includes 50 sequencing sort containers 20 such as 20-1, 20-2 . . . 20-50, and 25 route containers 40 such as 40-A, 40-B . . . 40-Y provided along the sides of platform assembly 10. As shown in the FIG. 3 embodiment, sequencing sort container 20-1 associated with the first delivery stop for each route can be omitted; accordingly, during the sequence sort, the articles associated with the first delivery stop can go direct to their respective route container 40 in the FIG. 3 embodiment.

Figure 3:
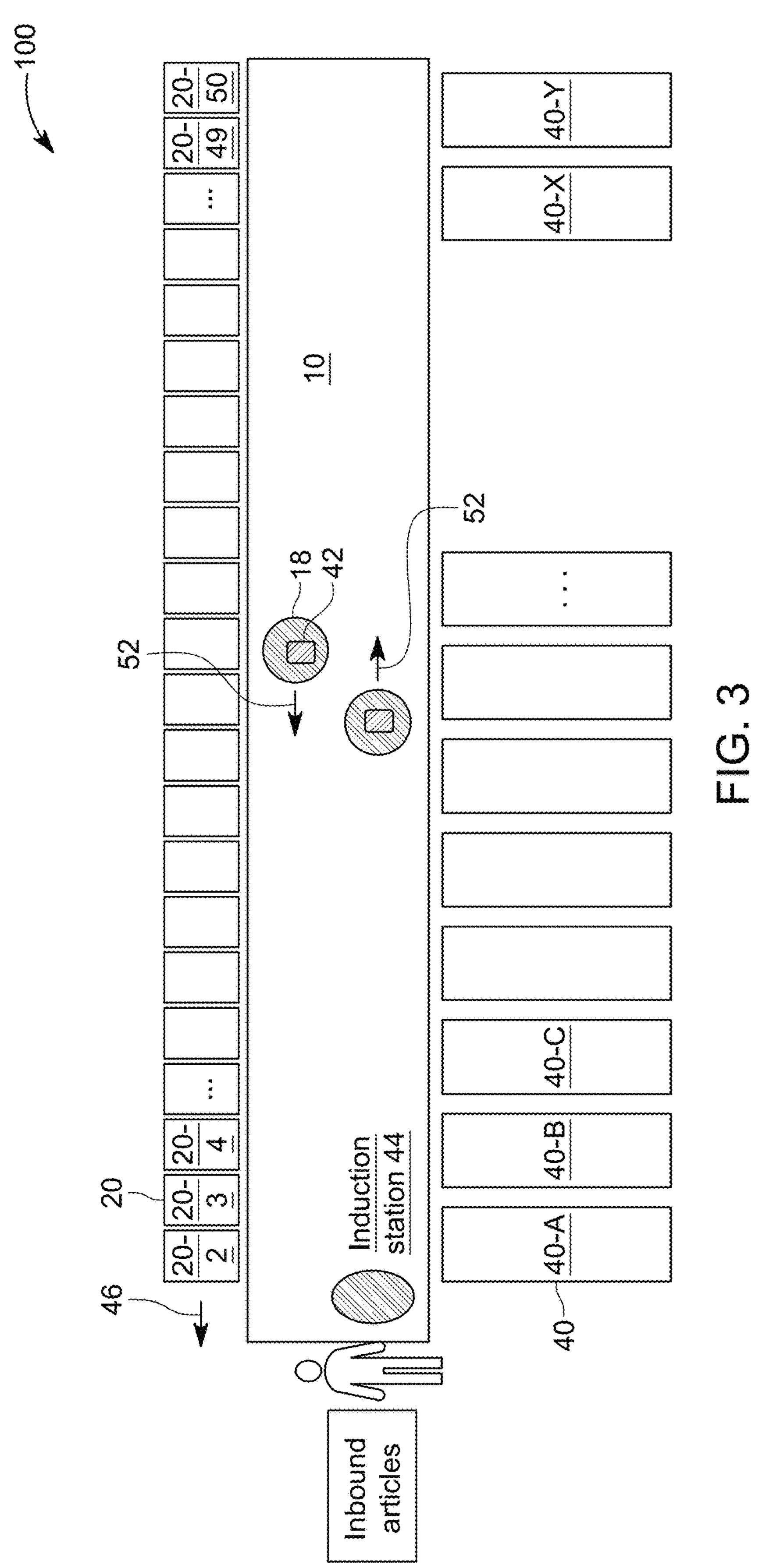
FIG. 3 is a schematic structural diagram of an embodiment of a delivery control system including a platform assembly, sequencing sort containers and route containers, according to the present invention.

In one embodiment, sequencing sort containers 20 can be totes or bags. In one embodiment, each route container 40 can instead be a chute leading the loading area of a delivery vehicle; accordingly, one or more of the route containers 40 can be a chute with or without a corresponding container associated with the chute. As shown in FIG. 3, for example, system 100 can further include articles 42 placed on vehicles 18 that traverse platform assembly 10. Platform assembly 10 (see FIG. 3) can include one or more lanes formed on its surface so that the vehicles 18 may traverse along the lanes. The lanes may be formed around, across or in any other configuration on the surface of platform assembly 10 to facilitate movement of the vehicles 18.

Platform assembly 10 can include two lanes for the computer-controlled transport vehicles to traverse therethrough—a first lane and a second lane. Accordingly, the platform assembly (or simply the "platform") includes two lanes for the vehicles 18 to traverse therethrough. First lane can be configured for a computer-controlled transport vehicle to travel proximal a sequence container or a route container, whereas the second lane can be configured for the vehicle 18 to divert an article 42 transported by the vehicle 18 onto the sequence container or a route container. The sequencing sort containers 20 and the route containers 40 can be positioned proximal a recess in a platform assembly.

Controller 26 forming part of a system 100 communicates with vehicles 18 and with a plurality of other components of system 100. Controller 26 communicates over the network 29, which may be a wired or wireless network. The wireless network may be Bluetooth®, WIFI, a specific Radio Frequency, cellular, and the like. Controller 26 may be embodied as a computing device with a processor and a memory, where the processor executes many instructions provided herein. Controller 26 may be configured to receive instruction for sequence sorting and route sorting a plurality of disparate articles along a plurality of routes, each route including a plurality of delivery stops. Controller 26 communicates with one or more induction stations 44 positioned on or about the platform assembly 10. Each induction station 44 includes an imaging device or scanner.

System 100 can be configured for determining and assigning a delivery stop and a route for each of the articles with the help of article sequencing engine 118 and article routing engine 119. Controller 26 may be configured to direct the vehicle 18 to transport a selected article 42 which is stowed about the vehicle at induction station 44 by an operator to a container 20/40 and deposit/unload the article 42 by manipulation of the transport vehicle for deposit of the selected article in the container 20/40. In one embodiment, as a vehicle 18 traverses over platform assembly 10, controller 26 communicates over network 29 with the vehicle 18 to determine that a specific vehicle 18 is at a location associated with a specific sequencing sort container 20-1 or 20-2 or a specific route container 40-A or 40-B, for example. The location of the specific vehicle 18 is then compared with a known association of an article 42 being sorted with the specific sequencing sort container 20 or a specific route container 40 for the article 42 being carried by the specific vehicle 18. Accordingly, controller 26 can direct vehicle 18 to traverse over a surface of platform assembly 10 to the specific destination container associated with that article such as a sequencing sort container 20 or a route container 40 (route container 40 may be or may include a chute in one embodiment); controller 26 can further direct the deposit of article 42 into the specific destination container associated with that article such as sequencing sort container 20 or route container 40.

Vehicle 18 may include a sorting robot, a transportation robot, a loading/unloading robot or other types of traveling robots. Vehicle 18, in addition to being in wireless connection with controller 26, may also be in wireless connection with delivery management server 110, article sequencing engine 118 and article routing engine 119. Based on instructions/signals received from the controller 26 0, vehicle 18 is capable of traveling forward or backward along a lane as well as turning to a target area associated with a sequencing sort container 20 or a route container 40 for unloading (or loading) articles.

In various embodiments, system 100 receives a plurality of articles from an article supply location at a warehouse. At induction station 44 (see FIG. 3) an information acquisition device 120 (not shown in FIG. 3) interacts with an identifier associated with an article 42 selected for sequence sorting and route sorting, for example, by an operator placing the article 42 near or under the information acquisition system 120 at induction station 44. Information acquisition system 120 is configured for imaging a destination address for the selected article, the destination address corresponding to the first, second, third or other delivery stop along a respective route where the destination address is located, each destination address associated with a delivery stop. The imaging is compared with a database comprising a plurality of street addresses associated with a market or region. The control system is configured to determine a destination address for the article based on the comparison with the database. The control system is further configured to determine a delivery route and a delivery stop along the delivery route for the article based on the destination address for the article.

In one embodiment, information acquisition system 120 may "read" destination address information code present on the article via a scanner, wherein the scanner is configured to scan the information code for obtaining the destination of the article to be sorted. For example, the article to be sorted is provided thereon with information code such as a bar code, a two-dimensional code, a radio frequency (RF) tag, a QR code, etc., and correspondingly, the information acquisition device may be a bar code scanner, a two-dimensional code scanner, a radio frequency identifier, etc. In some embodiments, in addition to the destination, the system 100 may further capture additional information about the article's volume, weight etc., and correspondingly, the information acquisition device may further include a weighing device, a volume scanner, etc. In order to improve the efficiency of subsequent sorting, preferably, after various details regarding the article is obtained by the control system, it may perform a complete analytical processing of the obtained article information, thereby obtaining the destination information of the article to be sorted. For example, the control system may interact with the information acquisition device so as to obtain the article information acquired by the information acquisition device, to obtain the destination of the respective article to be sorted. The control system may further determine a delivery route and a delivery stop along the delivery route for the respective article based on the destination address for the article.

In one embodiment, after completing the route optimization analysis by system 100, article sequencing engine 118 and article routing engine 119 can cooperate with system 100 and delivery management server 110 to cause controller 26 to direct an automated or robotic machine such as vehicle 18 to traverse platform assembly 10 to transport the article first to an appropriate sequencing sort container 20 during the sequence sort step, and then from the sequencing sort container 20 to an appropriate route container 40 (which may be a chute instead of a container) corresponding to the destination for the article during the route sort step, as determined by system 100 as described herein. Accordingly, system 100 configured to determine a destination address for an article, and assign a route and a delivery stop on the route for delivery of the article based on the destination address for the article.

System 100 is configured for determining and assigning a delivery stop and a route for each of the articles with the help of article sequencing engine 118 and article routing engine 119. In various embodiments, article sequencing engine 118 and article routing engine 119 cooperate with system 100 and with delivery management server 110 to optimize the route to be taken by a computer-controlled transport vehicle from the sorting facility to the destination of a plurality of articles being sorted. For example, article sequencing engine 118 and article routing engine 119 can operate to sequence a plurality of delivery stops within each of a plurality of routes based on one or more predefined criteria. The criteria can include optimization of factors associated with the delivery route. In one example, optimization of the delivery route may be associated with reducing the total resources allocated for the delivery of all articles along a given route. The optimization may take into account constraints in the delivery network such as labor capacity, facility capacity, and vehicle capacity. The optimization may further take into account delivery time requirements, as in the case of same-day deliveries, next-day deliveries or deliveries guaranteed before a certain time. In one embodiment, delivery route optimization may include consolidating all deliveries to one side of a highway together; it may also include consolidating all deliveries requiring only right turns by the delivery vehicle to be made together. In one embodiment, route optimization may include assigning the smallest delivery vehicle required for the group of articles to be delivered along a given route. In one embodiment, route optimization may include assigning the delivery vehicle that includes a lift needed for delivering a heavy article. In one embodiment, route optimization includes sorting articles such as to avoid or limit overtime paid to sorting crews. In one embodiment, route optimization includes sorting articles such as to avoid or minimize overtime paid to delivery vehicle drivers. In one embodiment, route optimization includes picking a route based on the time of day to minimize traffic delays; in another embodiment, route optimization includes picking a delivery time for a delivery requiring signature such that the likelihood of a person available at the delivery destination for signing receipt of article is high.

Accordingly, in at least one embodiment, article sequencing engine 118 and article routing engine 119 are configured for sequencing a plurality of delivery stops within each of a plurality of routes based on a predefined criterion that includes one or more of the following: delivery route optimization, delivery vehicle characteristic optimization, delivery vehicle driver work shift optimization, delivery distance optimization, delivery time optimization, delivery route fuel usage optimization, time of day optimization, traffic optimization, network carbon footprint optimization, total network cost optimization, and article condition optimization.

As illustrated in FIG. 2, for example, each of the route containers 40 can be assigned to a specific route, whereas each of the sequencing sort containers 20 can be assigned a specific delivery stop sequence (e.g. a delivery stop number 1, a delivery stop number 2, a delivery stop number 3, and so on). Stated differently, each sequencing sort containers 20-1, 20-2, 20-3, . . . 20-25 (i.e., each sequencing sort receptor) is associated with a delivery stop in a route sequence, with "20-1" being the first delivery stop for each route, "20-2" being the second delivery stop for each route, etc. Controller 26 can then direct transport of articles associated with a first delivery stop of each route to a first sequencing sort container 20-1. Similarly, controller 26 can direct transport of articles associated with a second delivery stop of each route to a second sequencing sort container 20-2. Accordingly, during the sequencing sort step, the articles are placed in sequencing sort containers 20 such that each of the sequencing sort containers 20-1, 20-2, etc. holds therein articles having the same delivery stop sequence position in their respective routes.

In at least one embodiment, the sequencing sort by article sequencing engine 118 can occur in a first step while the route sort by article routing engine 119 can occur in a second step, with the sequencing sort commencing prior to the route sort.

During the sequencing sort step, article sequencing engine 118 operates to sequence articles 42 in cooperation with system 100 based on a delivery stop along a delivery route determined for the article. Accordingly, article sequencing engine 118 is configured for sequencing the plurality of delivery stops within each of a plurality of routes. Controller 26, in cooperation with article sequencing engine 118, further directs a vehicle 18 carrying an article 42 thereon to an assigned sequencing sort container 20. Controller 26 also directs the deposit of article 42 into the assigned sequencing sort container 20. Thus, during the sequence sort step, once controller 26 determines that a specific article 42 needs to deposited into a specific sequencing sort container 20, controller 26 directs vehicle 18 to traverse a lane of platform assembly 10 to the specific sequencing sort container 20 and to deposit the specific article 42 by manipulation of the vehicle 18 from a first position where the specific article 42 is firmly located on the vehicle 18 to a second position where the specific article deposits in to the sequencing sort container 20. In one embodiment, the sequencing sort containers 20-1, 20-2, etc. (which may be totes in one example) are provided on an indexing conveyor, the indexing conveyor operating to bring each sequencing sort container 20 to the operator for induction at induction station 44.

During the route sort step that follows, sequencing sort containers 20-1, 20-2 . . . 20-50 are moved in sequence by the index conveyor close to the operator at the induction station 44. When the first sequencing sort container 20-1 reaches near the operator, the operator can commence placing each article within the first sequencing sort container 20-1 on a vehicle 18. The transfer of the articles from the sequencing sort containers to the vehicle 18 at or near induction station 44 can be automated in some embodiments, for example, by the use of a picking apparatus. It should be noted that each article in the first sequencing sort container 20-1 is associated with a first delivery stop in each of a plurality of routes. Controller 26 of the control system can then cause vehicle 18 carrying the article associated with the first delivery stop in each of a plurality of routes to the respective route container 40 such as 40-A, 40-B . . . 40-Y. In other words, vehicles 18 traverse the platform assembly 10 to deposit articles 42 associated with the first delivery stop into an appropriate route container 40-A, 40-B, . . . 40-Y among the 25 route containers 40 illustrated in FIG. 2 and FIG. 3.

After all articles in the first sequencing sort container 20-1 have been sorted to their respective route containers 40 such as 40-A, 40-B, the second sequencing sort container 20-2 can move along the index conveyor to get close to the operator at the induction station 44. The operator may place each article in the second sequencing sort container 20-2 on vehicles 18. It should be noted that each article in the second sequencing sort container 20-2 is associated with a second delivery stop in each of a plurality of routes. Controller 26 of the control system then causes vehicle 18 carrying the articles associated with the second delivery stop in each of the plurality of routes to the respective route container 40 such as 40-A, 40-B, etc. This process is repeated until the fiftieth sequencing sort container 20-50 (see FIGS. 2 and 3) has been emptied by the operator at the induction station 44, with the articles therein being transported by vehicles 18 to each of the plurality of routes to the respective route container 40 such as 40-A, 40-B . . . 40-Y.

During the route sort, controller 26 can direct transport of articles from the first sequencing sort container 20-1 to a respective route container 40 of a plurality of route containers 40-A, 40-B . . . 40-Y, wherein each route container 40 is associated with a route. For example, a first article from first sequencing sort container 20-1 is transported to a route container 40-A, a second article from first sequencing sort container 20-1 is transported to a route container 40-B, a third article from first sequencing sort container 20-1 is transported to a route container 40-C, and so on. After all of the articles in first sequencing sort container 20-1 have been transported to the respective route container 40, a first article from second sequencing sort container 20-2 is transported to a route container 40-A, a second article from second sequencing sort container 20-2 is transported to a route container 40-B, a third article from second sequencing sort container 20-2 is transported to a route container 40-C, and so on. Once second sequencing sort container 20-2 has been emptied, articles from third sequencing sort container 20-3 may be transported to the respective route container 40-A, 40-B . . . 40-Y. This process is repeated until every one of sequencing sort containers 20-1, 20-2 . . . 20-50 shown in FIG. 2 (i.e., each sequencing sort receptor) has been emptied. In various embodiments, the transport of articles from the second sequencing sort container 20-2 commences only after completion of the transport of articles from the first sequencing sort container 20-1. Similarly, transport of articles from the third sequencing sort container 20-3 commences only after completion of the transport of articles from the second sequencing sort container 20-2, and so on. Accordingly, in various embodiments, the transport of articles from the second sequence container commences after completion of the transport of all articles from the first sequence container.

In some embodiments, each of route containers 40-A, 40-B, etc. is a chute (rather than a container) associated with a respective route. In one embodiment, at least one route container of the plurality of route containers 40 includes a chute. Accordingly, the system can be further configured for directing transport of at least one of the articles to a chute location associated with the respective route container 40. In one embodiment, the system can be further configured for directing transport of at least one of the articles to a chute location instead of a route container 40.

In various embodiments, the control system is further configured for directing and coordinating delivery of the article at the first delivery stop using a delivery vehicle. The delivery vehicle can be an unmanned vehicle in one embodiment. The delivery vehicle can be an airborne vehicle such as a drone in one embodiment. In some embodiments, the control system further comprises a scale or dimensioning device configured to interact with the article to measure one or more physical characteristics of the article.

In one embodiment as illustrated in FIG. 2, platform assembly 10 can have a single-finger layout. The FIG. 2 embodiment further includes 50 articles per route and 25 routes labeled "40-A" to "40-Y". Accordingly, in the example illustrated in FIG. 2 wherein there are 50 articles per route and 25 routes, controller 26 of system 100 may perform the sequence sorting and route sorting as follows. During the sequence sort, each sort location represents the position in a route sequence, with "1's" being the first delivery stop for each route, 2's being the second delivery stop for each route, etc., the sequencing sort will sort all articles to sequencing sort containers 20, each sequencing sort container 20 holding articles with the same sequence position in their respective routes. During the route sort, each route container 40 represents a specific route (in some embodiments, each sort location can represent a chute instead of, or in addition to a container), the system can control the deposition of articles into each of the route containers 40 in sequence beginning with 1's. All articles with a sequence position of "1" are sorted first, then 2's, and so on, until all are in delivery sequence in their respective route chutes.

The FIG. 3 embodiment is different form the FIG. 2 embodiment in that sequencing sort container 20-1 associated with the first delivery stop for each route is not provided in the embodiment illustrated in FIG. 3. Thus, in the FIG. 3 embodiment, during the sequence sort, the articles are sorted according to their sequence number within their respective route, except that articles associated with the first delivery stop go direct to their respective route container 40. The route sort commences after completion of the sequence sort. In the FIG. 3 embodiment, during the sequence sort, an operator starts inducting all of the 2's, then 3's, then 4's, etc., in sequence. The sequencing sort container 20 (which may be totes in one example) can be provided on an indexing conveyor, the indexing conveyor operating to bring each sequencing sort container 20 to the operator for induction. The controller will commence directing transport of articles in sequencing sort container 20-2 to a route container only after the articles associated with the first delivery stop in each of the routes have been transported to the respective route container. In alternate embodiments, computer-controlled transport vehicles carrying the articles destinated for the first delivery can stop to stay parked while holding the articles destinated for the first delivery stop thereon, such that the controller can commence transporting articles in sequencing sort container 20-2 to a route container before the articles associated with the first delivery stop in each of the routes have been deposited within to the respective route container or chute that server the respective route container. It should be noted that too many of such parked transport vehicles carrying the out-of-sequence sort articles can result in a massive number of parking spots needed for the parked transport vehicles that can clog up the transport surface of the platform assembly 10.

In one embodiment, platform assembly 10 can be a 2-lane wide table as illustrated in FIG. 3 whereby during sequence sort, the north lane (i.e., the upper land) can be used for diverting and the south lane (i.e., the lower land) can be used for travel of vehicles 18. During the route sort, the south lane can be used for diverting and the north lane can be used for travel of vehicles 18. Induction station 44 would be located as shown in FIG. 3 for the sequencing sort and would be moved up one grid location for route sort. In other words, induction station 44 can be substantially aligned with the south lane during the sequence sort, and substantially aligned with the north lane during the route sort. Further, vehicle flow direction can be configured along direction 52 as shown by arrows in FIG. 3 for the sequencing sort, with the transport vehicle flow reversed for the route sort. In one example, the FIG. 3 embodiment can advantageously allow a single operator to sort and sequence the 25 routes in 3.5 hours (50 packages×25 routes=1,250 articles; each article being sorted twice =2,500 sorting operations; and, 2,500/750 handling capacity by a single operator per hour =3.5 hours). In one embodiment, the platform assembly can be 26 meters long and one meter wide.

Figure 4:
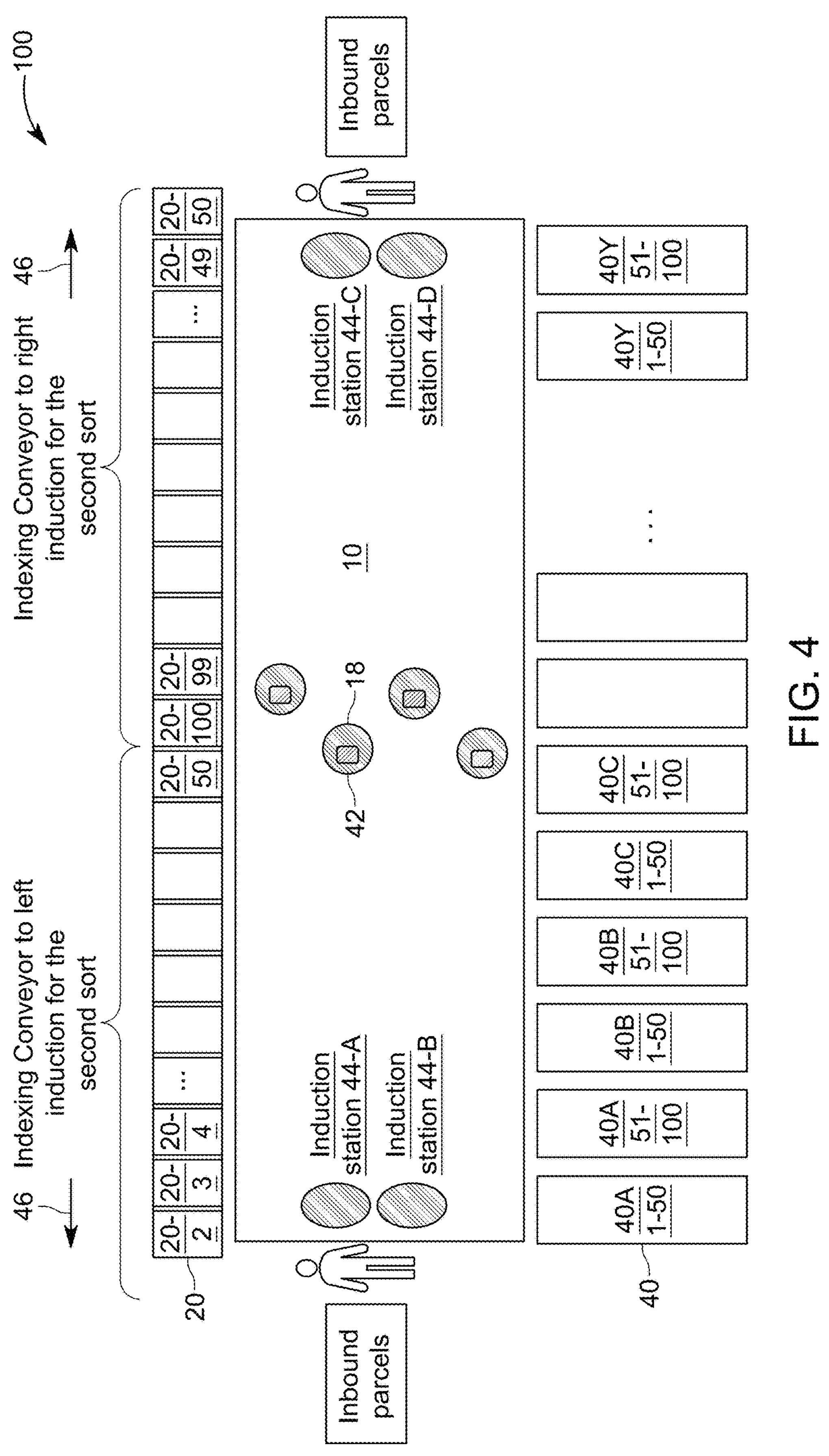
FIG. 4 is a schematic structural diagram of an embodiment of a delivery control system including a platform assembly, sequencing sort containers and route containers, according to the present invention.

FIG. 4 illustrates another embodiment of the presently disclosed subject matter wherein platform assembly 10 includes a single finger with two induction stations 44-A and 44-B provided on one end of platform assembly 10 and two induction stations 44-C and 44-D provided on one an opposing end of platform assembly 10. The FIG. 4 embodiment further includes 100 articles per route and 50 routes. In the FIG. 4 embodiment, during the sequence sort step, the articles are sorted according to their sequence number within their route, except that articles destined for delivery stop 1 and delivery stop 51 go direct to their respective route containers. Each route is provided with two route containers/chutes—one for articles 1-50 (i.e., 40A-1-50 for articles 1-50) and one for articles 51-100 (i.e., 40A-51-100 for articles 51-100). The system can allow two operators to sort and sequence 5000 parcels in 7 hours (100 articles×50 routes=5000; each article being sorted twice =10,000 sorts; 10,000/750 per inductor/2 Inductors=7 hours). The time can be further reduced to about 5 hours by using waiting transport vehicles. In one implementation, the platform assembly of this embodiment can have a length of 102 meters and a width of 4 meter. However, the platform assembly can have other shapes and layouts besides a straight-line layout as shown in FIG. 4 to reduce the length of the space required; for example, the platform assembly can include an "E" or "U" shape, or a similar other shape. It should be noted that additional induction stations besides induction station 44-A, induction station 44-B, induction station 44-C, and induction station 44-D can be provided; however, each route may need to have as many chutes as there such additional induction stations in order for the route sort to occur efficiently. The grid map for the transport vehicle flow can change between the two sorts (i.e., between the sequence sort and the route sort) to optimize transport vehicle flows. Indexing conveyor movement 46 can be configured for the efficient operations of the sequence sort and the route sort. For example, in one embodiment, indexing conveyor movement 46 may index a first group of sequencing sort containers 20 for left side induction at induction station 44-A and at induction station 44-B; indexing conveyor movement 46 may further index a second group of sequencing sort containers 20 for right side induction at induction station 44-C and at induction station 44-D.

Figure 5A:
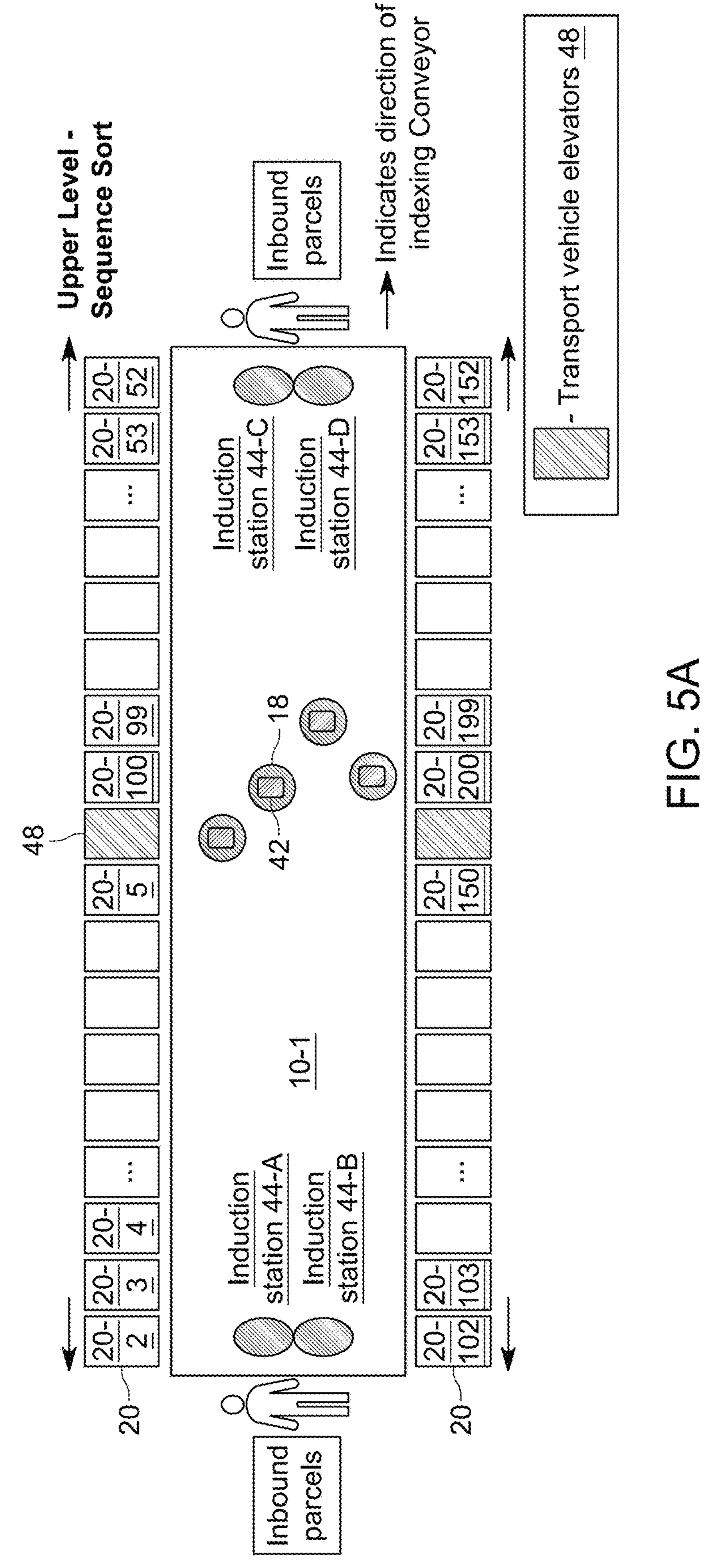
FIG. 5A and FIG. 5B are schematic structural diagrams of an embodiment of a delivery control system including a platform assembly, sequencing sort containers and route containers, according to the present invention.
Figure 5B:
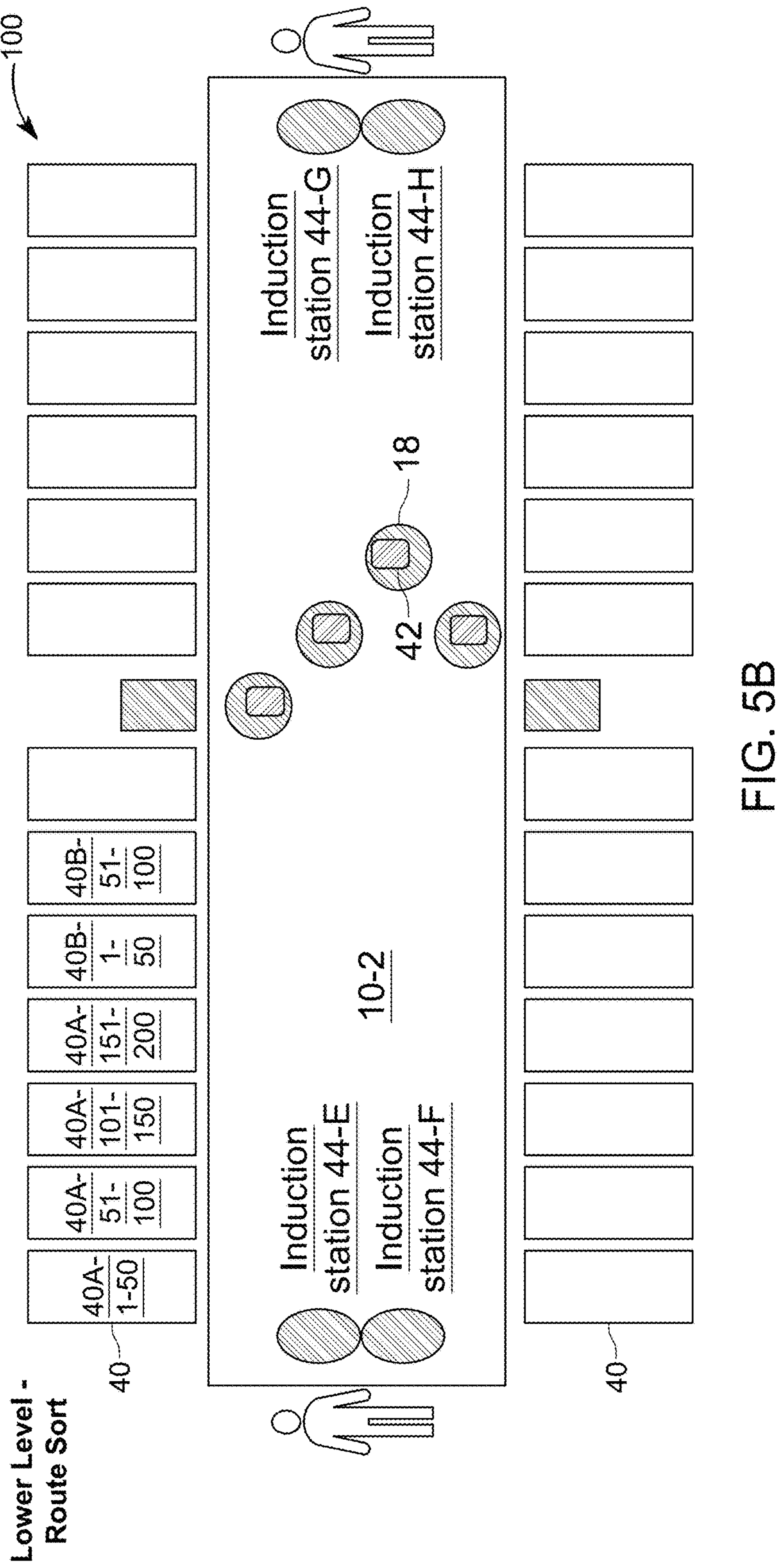

FIGS. 5A and 5B illustrate another embodiment of the presently disclosed subject matter that includes a platform assembly with a single-finger layout with a two-level implementation having platform sub-assembly 10-1 on an upper level (see FIG. 5A) associated with a sequence sort and a platform sub-assembly 10-2 on a lower level (see FIG. 5B) associated with a route sort. The implementation illustrated in FIG. 5A and FIG. 5B includes two or more transport vehicle elevators 48 provided at each of the two levels, namely platform sub-assembly 10-1 on the upper level, and platform sub-assembly 10-2 on the lower level. Transport vehicle elevators 48 can advantageously accommodate routing articles 42 that can go directly to their route container 40 or to a route chute. Transport vehicle elevators 48 can further advantageously allow for the waiting vehicles 18 to wait on the lower level (i.e., wait on platform sub-assembly 10-2), thus providing more locations for transport vehicles to wait. In the FIG. 5 embodiment (i.e., the embodiment illustrated in FIG. 5A and FIG. 5B), sequence sort is performed on the top level and the sort route is performed in the lower level. The FIG. 5 embodiment can conveniently improve the density of chutes associated with the route containers. The FIG. 5 embodiment can further conveniently eliminate the need to modify the grid map associated with the travel of vehicles 18 on the platform sub-assemblies 10-1 and 10-2 between sorts, i.e., between the sequence sort step and the route sort step.

Figure 6:
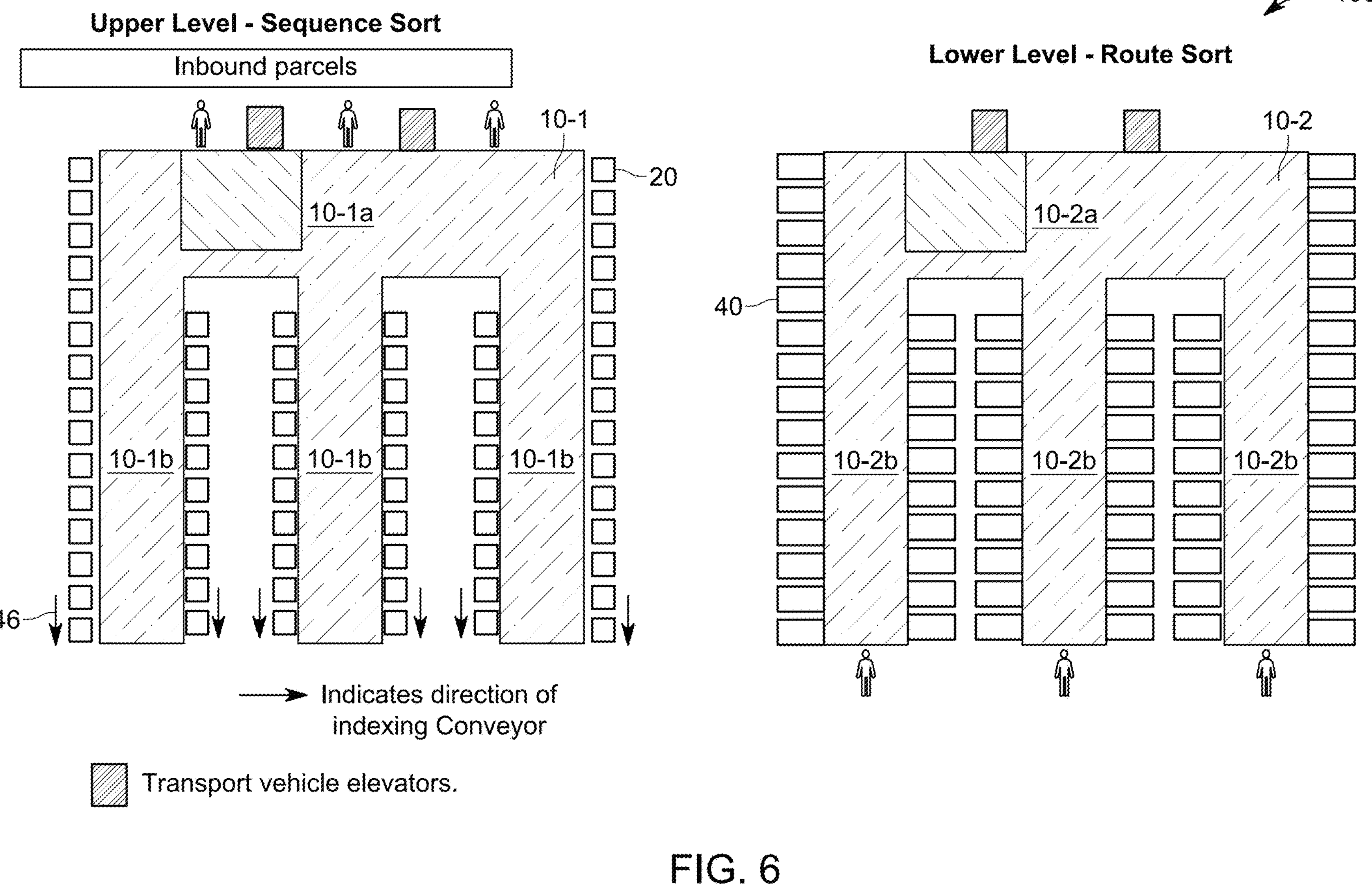
FIG. 6 is a schematic structural diagram of an embodiment of a delivery control system including a platform assembly, sequencing sort containers and route containers, according to the present invention.

In at least one embodiment, each sequencing sort destination or route container for the sequencing sort on the top level can be configured as a chute, a gaylord, a receptacle, a bin or a bag. In other words, the sorting destination can be more than just bins or bags or containers. For example, in some embodiments, each sequencing sort destination on the top level can be configured as an accumulation chute such as, for example, a gravity conveyor, that dumps an article onto a singulating conveyor at the lower level, whereby a belt can induct the dumped article onto a vehicle 18 on the lower level for route sorting. FIG. 6A and FIG. 6B illustrate another embodiment of the presently disclosed subject matter that includes a multi-finger layout combined a two-level implementation having platform sub-assembly 10-1 on an upper level associated with a sequence sort and a platform sub-assembly 10-2 on a lower level associated with a route sort. In this embodiment, sequence sort occurs at the upper level (i.e., at platform sub-assembly 10-1), and route sort occurs at the lower level (i.e., at platform sub-assembly 10-2). In various embodiments, at the upper level (i.e., at platform sub-assembly 10-1), the sequence sort induction can occur on highway portion 10-1*a* of platform sub-assembly 10-1, whereas route sort induction can occur on finger portion(s) 10-1*b* of platform sub-assembly 10-1. Similarly, at the lower level (i.e., at platform sub-assembly 10-2), the sequence sort induction can occur on highway portion 10-2*a* of platform sub-assembly 10-2, whereas route sort induction can occur on finger portion(s) 10-2*b* of platform sub-assembly 10-2. The use of a highway portion 10-1*a* and 10-2*a* can create additional parking spaces for vehicles 18, which means the route sort can begin a litter earlier as compared to the single-finger system illustrated in FIG. 5A and FIG. 5B.

Figure 7A:
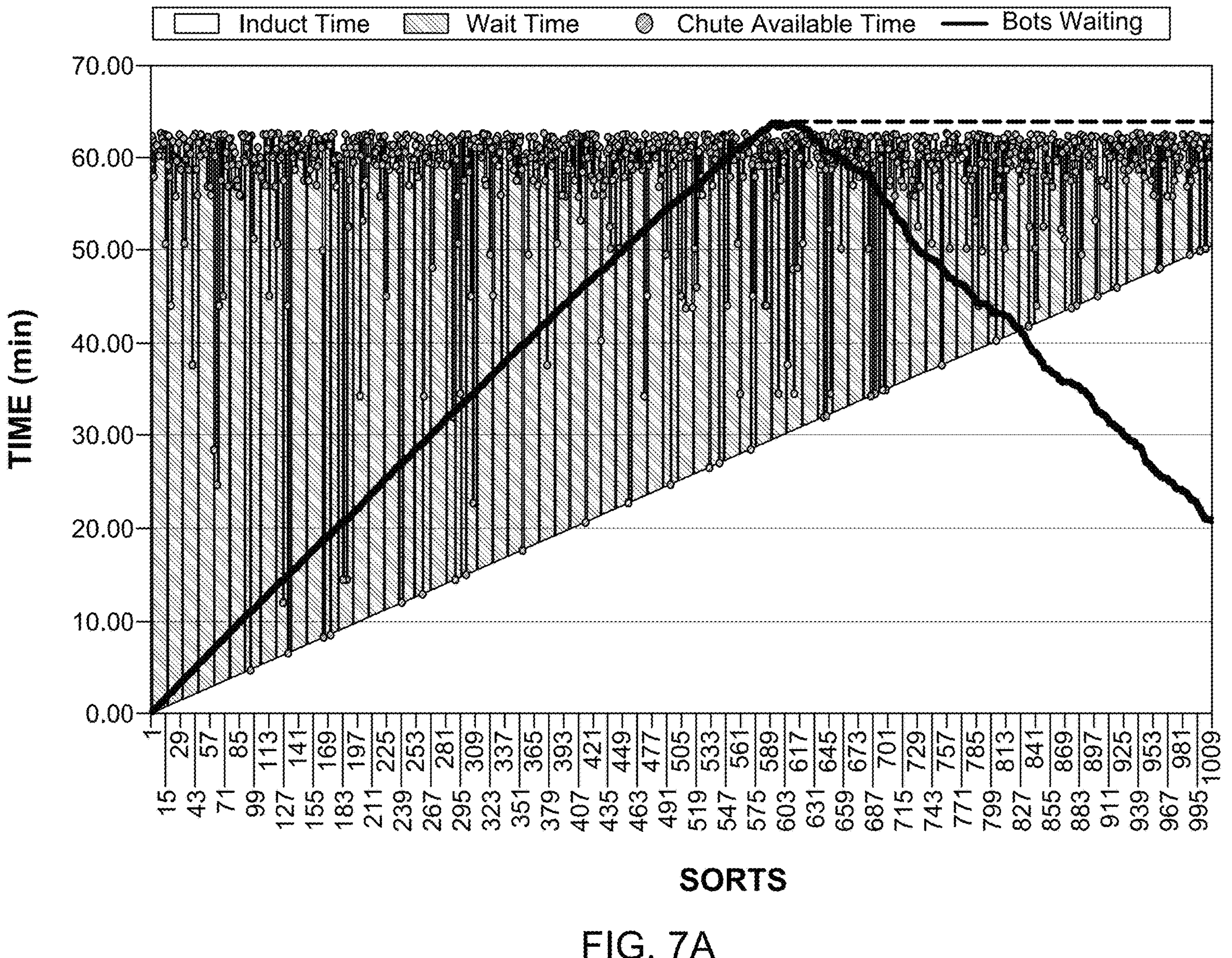
FIG. 7A and FIG. 7B are graphical representations of a simulation showing both sequence sort and route sort being performed at the same time by having transport vehicles waiting with an article to be sorted held thereon, according to the present invention.
Figure 7B:
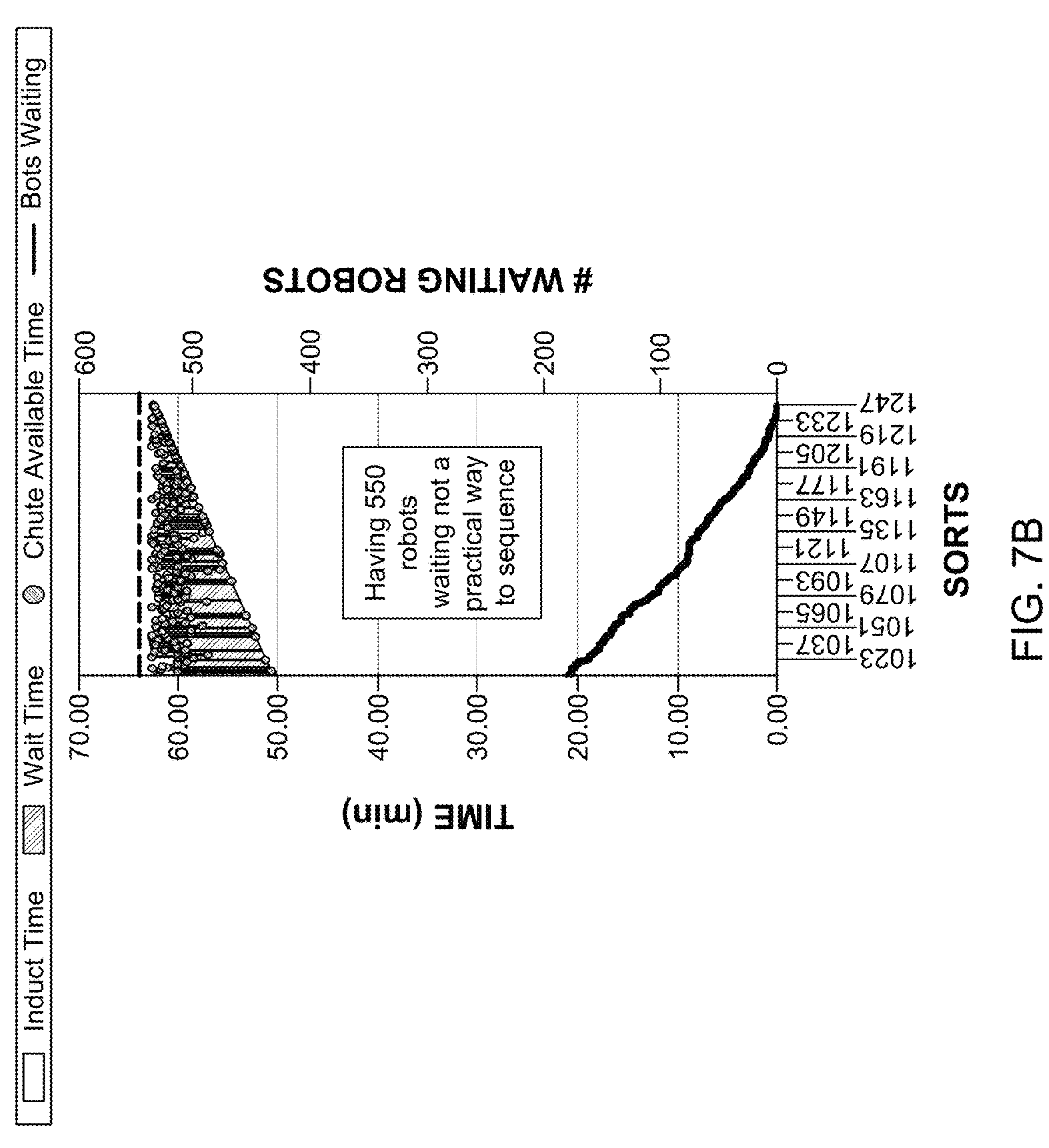

FIG. 7A and FIG. 7B illustrate graphical representations of a simulation showing an attempt to do both sequence sort and route sort at the same time by having as many vehicles 18 (alternately referred to herein as robots or bots) as needed waiting with each transport article carrying or holding an article to be sorted held thereon. The simulation includes 25 routes with 50 articles in each route. The simulation further assumes uniform distribution, i.e., any article 42 is just as likely to belong to any route or sequence number as another article 42. This simulation advantageously demonstrates that it is possible, but not practical, to sort by route and sequence by having so several of the transport vehicles wait; the vertical lines represent transport vehicles or transport vehicles wait times. This simulation indicates that 550 transport vehicles are required, as indicated by the peak of the mountain formed by the continuous line running from the left bottom to the middle top to the right bottom. Accordingly, with a throughput of 1200/hour, the sort can take 63 minutes, with most of the diverts occurring during the last 10 minutes, as represented by the dots that indicate completed sorts.

Figure 8A:
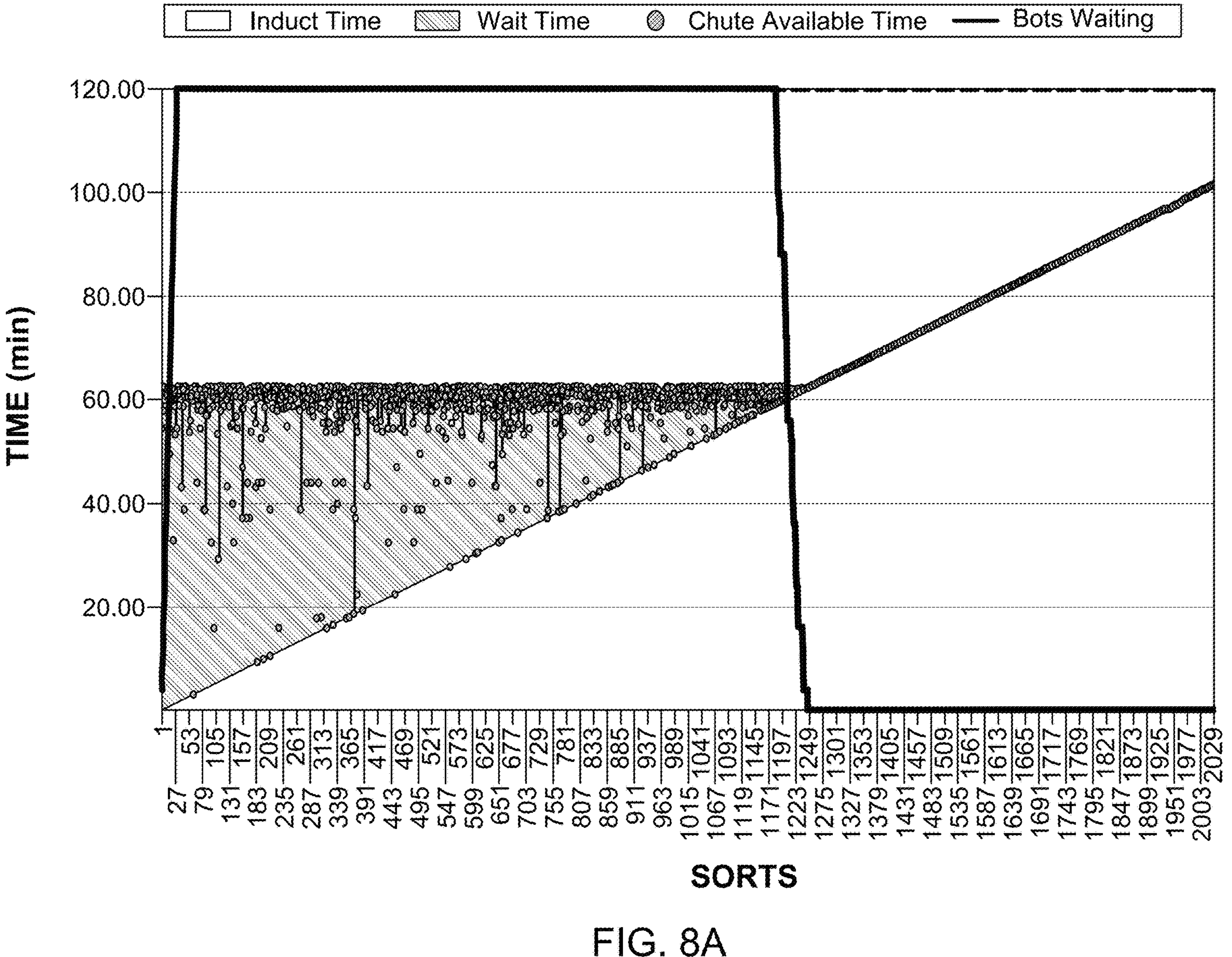
FIG. 8A and FIG. 8B are graphical representations of a simulation showing performing of a sequence sort followed by performing of a route sort, according to the present invention.
Figure 8B:
Figure 8B:
Figure 8B:
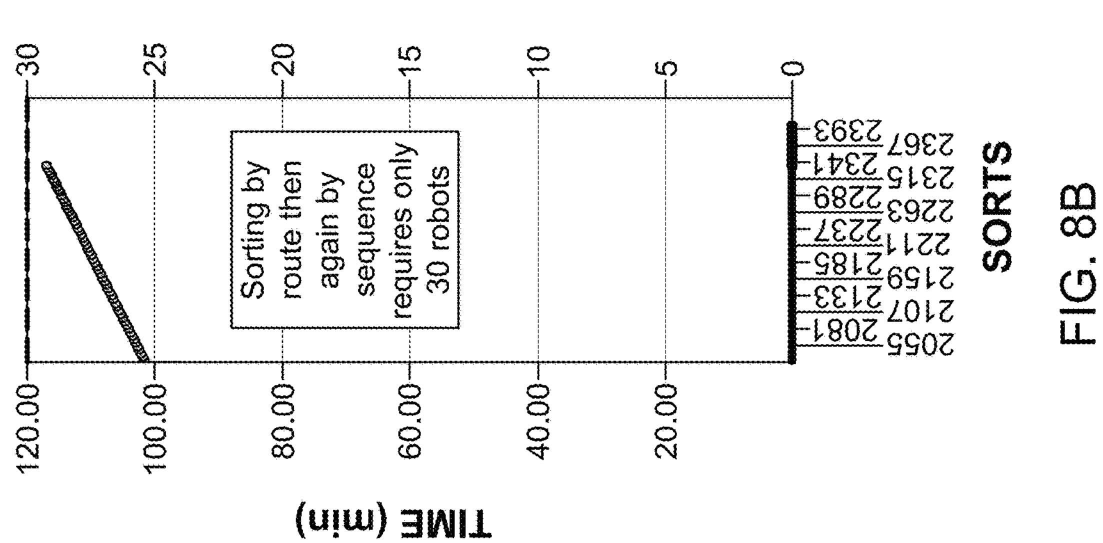

FIG. 8A and FIG. 8B illustrates graphical representations of a simulation showing an attempt to first perform sequence sort, and then perform route sort. This simulation includes 25 routes with 50 articles in each route. In this example, the number of waiting transport vehicles is limited to 30. Further, in this simulation, not all articles need to be sorted twice since some of the articles are sent directly to their route container or chute. The simulation indicates that it will take a total of about 1860 diverts to sort and sequence the 1,250 articles. The simulation further indicates that the more transport vehicles that are allowed to wait, the fewer diverts would be required, and the faster the sort steps and the sequence steps can be completed. The total time required for sequence sort and route sort calculates to about 116 minutes. This simulation assumes just one chute per route container; this simulation accordingly indicates that further optimization is possible if the simulation were to take into account multiple chutes serving per route/route container.

Figure 9A:
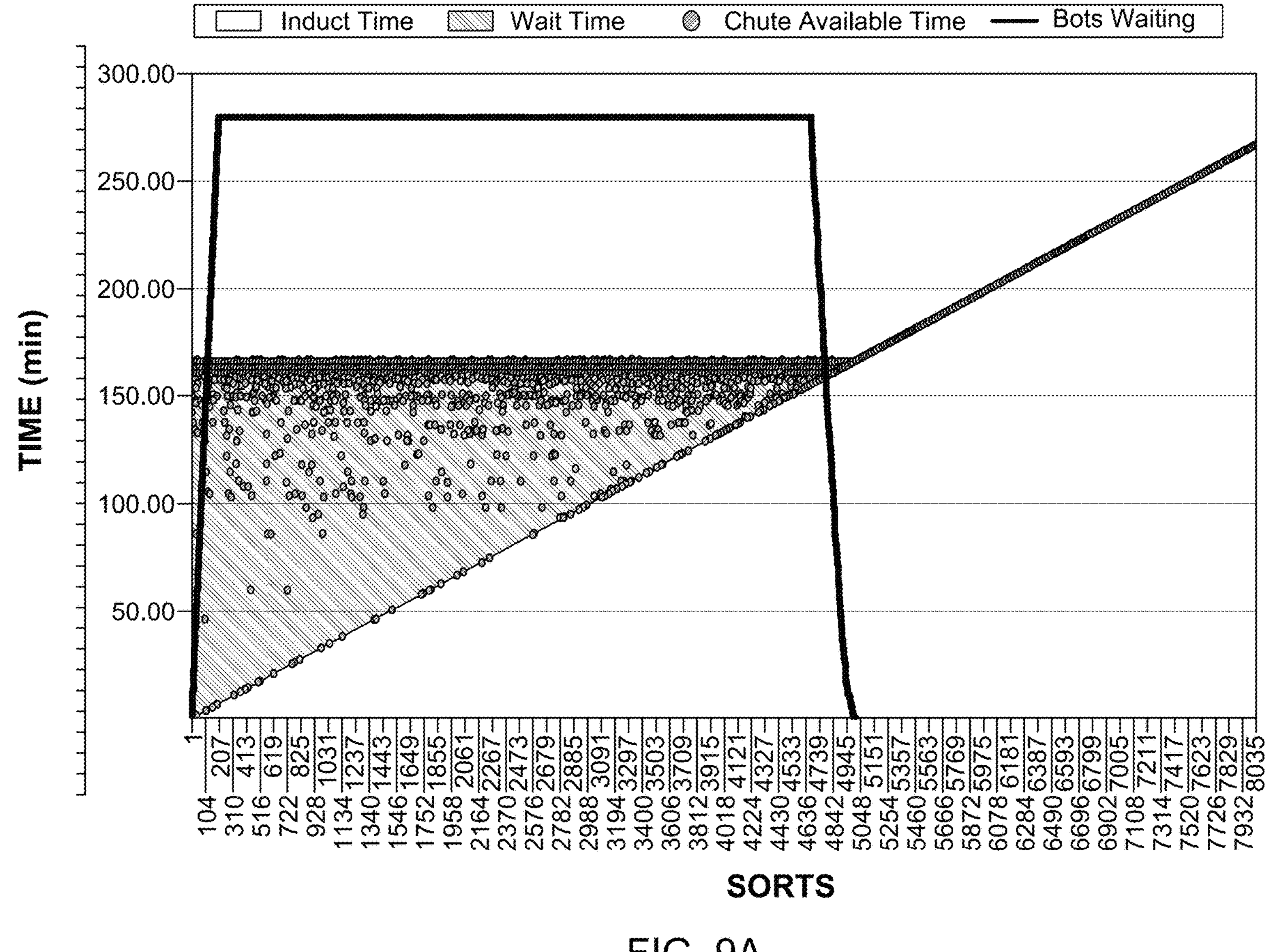
FIG. 9A and FIG. 9B are graphical representations of a simulation showing an example of implementing a multi-finger two-level set-up, according to the present invention.
Figure 9B:
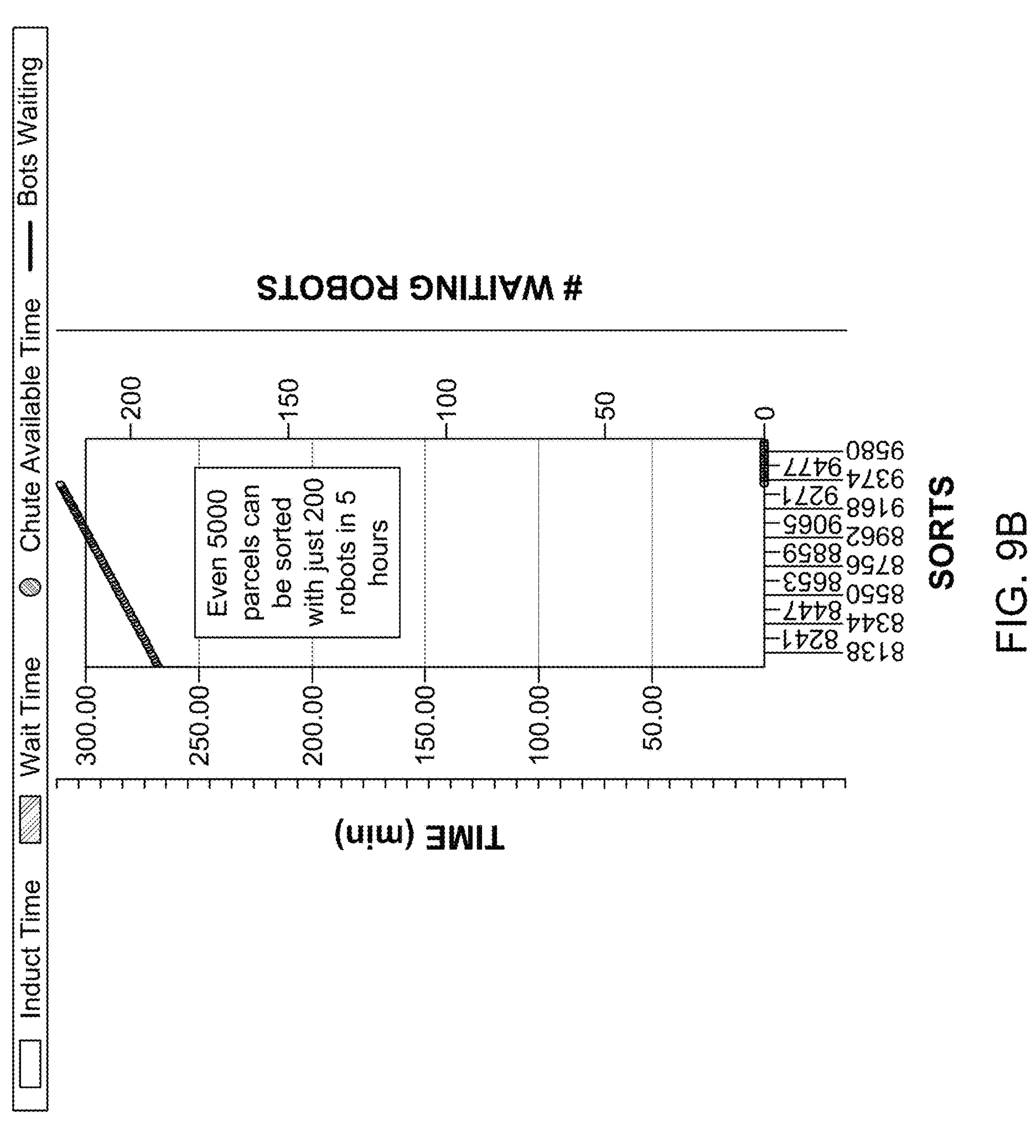

FIG. 9A and FIG. 9B illustrate graphical representations of a simulation showing implementation of a multi-finger two-level set-up. The two-level set-up is similar to the set-up illustrated in FIG. 6A and FIG. 6B. The simulation illustrated in FIG. 9A and FIG. 9B includes 5000 articles (50 routes with 100 articles each), 200 waiting transport vehicles at a maximum, 3 induction stations per level, and with an article handling speed of 600 articles handled per hour. The simulation indicates that the sequence sort and route sort under the multi-finder two-level set-up requires about 311 minutes.

Whereas the invention is explained with reference to computer-controlled transport vehicles, the invention is in no way limited to use with computer-controlled transport vehicles; the invention as described herein can be used in conjunction with all other kinds of sortation devices, techniques and systems. For example, the invention can be used in conjunction with various kinds of sortation equipment, systems and solutions equipment such as cross belt sorters, paddle sorters, pop-up transfer sorters, line shaft pop-up wheel sorters, pop-up steerable roller sorters, pusher or puller sorters, parcel singulators, line sorters, and tilt tray sorters, and diverter sorters, among others.

Further, embodiments disclosed herein can be advantageously used with any type of sortation system that incorporates a similar process flow where items are sorted initially into groups based on delivery position in the route and then sorted again to get in final delivery route sequence. The types of sortation systems that can utilize the embodiments disclosed herein can include tracked sorters, robotic sorters, loop sorters, linear sorters, over/under sorters, and manual sortation in the manner described. These types of sorters include but are not limited to a tilt tray sorter, a cross-belt sorter, a bomb-bay sorter, a pop-up sorter, a pusher sorter, a linear arm sorter, a pocket sorter, a narrow-belt sorter, an activated roller-belt sorter, mail sorter, shoe sorter, trap arm sorter, STV loop sorter, paddle sorter, pivot wheel sorter.

Sortation devices and systems automatically sort products as they move through warehouses and distribution centers. Several of these sortation systems are track-based in that the sortation process includes one or more components that move along fixed tracks. Background information on a few of the equipment, systems and solutions equipment that the invention can be used with is provided below.

Sortation solutions range from basic pushers and diverters that sort fewer than 30 cartons per minute to sophisticated high-speed sorters that handle as many as 450 items per minute. Sortation systems automatically sort products as they move through a facility. They reduce the manual labor needed to prepare for palletizing, packing, shipping and other industrial operations. Sortation systems can increase efficiency and provide more accurate fill rates, lower return rates and operating costs. These benefits add up to lower prices and faster delivery to the consumer. Most sortation systems can handle a variety of product, but aspects such as size, weight, balance or shape of product may rule out certain sortation technologies. For example, based on the speed of sortation, sortation systems can be broadly divided into slow-speed, medium-speed, and high-speed systems.

Slow-speed sortation systems, the slowest and least expensive sorters, work in conjunction with standard belt or roller conveyor lines. These sorters typically handle fewer than 30 cartons or totes per minute. One example of a slow-speed sorter is a deflector arm in which an arm or paddle sits alongside a conveyor line, opposite a divert point. As a carton approaches, the arm swings out across the conveyor, catching the carton and channeling it off at an angle. A large amount of space is needed between cartons to avoid traffic jams behind a deflector arm sorter. The deflectors can be used in a slug mode with the arm staying in place to divert a string of cartons down the same divert point. Another example of a slow-speed sorter is a pusher, which is mounted at the side of a conveyor line, directly across from a divert point. When a product reaches the divert point, the pusher springs out across the conveyor, pushing the product off at a right angle. Pushers can operate faster than deflector arms because they do not require as much space between cartons.

Medium-speed sortation handles about 30 to 200 items per minute. The most popular among them are pop-up sorters. These linear sorters usually move products down the line on belt conveyor. When a product reaches the product's divert location, wheels or rollers pop up under the product, lift it slightly above the conveyor surface, and power it off the conveyor, usually at a 30-degree to 45-degree angle. A common style of pop-up wheel sorter uses a wide conveyor belt that ends at a divert point and begins again right after the divert point, creating a gap in the conveyor. The gap is filled with several rollers that extend the width of the conveyor. When a carton reaches the gap in the conveyor, one of the following happens: (1) the angled wheels remain in place and the carton continues moving forward—across the rollers and onto the next section or conveyor, or (2) the angled wheels rise up under the product, lifting it slightly off the conveyor. The wheels then rotate, diverting the carton off the line. An alternate style of pop-up sorter uses multiple narrow conveyor belts instead of one wide belt. At each divert point, angled wheels are positioned in the gaps between narrow belts. These wheels sit below the level of the conveyor until they're needed to divert a carton. When a product reaches the divert point, the angled wheels rise up under the product and divert it. Pop-up style sorters work best for sorting cartons or other items with firm, flat bottoms. The function of the pop-up sorters and narrow belt sorters is accordingly to divert the product by a mechanism located at each output. The product is pushed upward while it is turned out (a previous analysis of the operation is required to determine which of the two sorters accuracy is a better proposal). Pop-up sorters and narrow belt sorters typically handle products with rigid and flat bottom.

When speed is of the essence, high-speed sorters can divert about 150 to 450 items or cartons per minute, or up to 27,000 cartons per hour. Products can be inducted to the sorter manually or automatically using induction conveyor. Higher speed means a higher level of technology and sophistication. There are four common types of high-speed sorters. Tilt-tray, crossbelt and bomb bay sorters are typically used to sort individual items to workstations such as packing stations or returns processing stations. The fourth type of high-speed sorter is a sliding shoe sorter, which usually handles larger cartons and totes. Tilt tray, crossbelt and bomb bay sorters operate under similar principles, and each type of sorter has the same foundation: a looped track with individual carriages riding on the track.

In a tilt tray sorter, each carriage holds a wooden or plastic tray. Items arrive at the sorter and are released one at a time onto the trays. An item moves around the track until it reaches its intended divert location. Its tray then tilts to one side and gravity pulls the item off the tray. Items usually slide onto a chute or onto a takeaway conveyor positioned at the side of the sorter. The tray then rights itself and is ready to accept another item for sorting. A tilt tray sorter requires more space between divert locations than a crossbelt sorter, but it also has fewer moving parts, making it less expensive and easier to maintain. A tilt tray sorter operates by trays that when they reach the correct position, they lean forward and drop the product. Like the crossbelt it is for demanding operations, but must be analyzed under the operation, type of product or industry. A tilt tray sorter can typically handle different packages, which can be small or large, amorphous or regular, light or as heavy. This sorter is particularly suitable for rough operations. Tilt tray sorters and crossbelt sorters are multi-induction have different entry points where different range of products are input.

A crossbelt sorter works on the same basic principle, except instead of a tray, each carriage in the systems holds a 2-foot to 3-foot cell of belt conveyor powered by a small motor. When an item reaches the divert location, the motor moves the conveyor, discharging the item sideways off the sorter into a chute or onto a takeaway conveyor. While crossbelt sorters are the most expensive of these high-speed options, they also offer the most product control because they use their own power to divert products rather than relying on gravity. This means the sorter can go faster and the divert locations can be placed closer together. Crossbelt sorters are widely used for the shipping industry and in general when a large number of outputs are required for its high productivity in the assortment of products. A crossbelt sorter can handle products with irregular shapes.

In a bomb bay sorter, each carriage on the track holds a flat tray that has a split down the middle. When an item reaches its intended location, the two sides of the tray swing down and apart, dropping the item into a chute or container positioned directly below the sorter. Bomb bay sorters are generally less expensive than tilt tray or crossbelt sorters, but they also have the lowest throughout. And while tilt tray and crossbelt sorters can accommodate long items by allowing one item to span across two trays or two belts, bomb bay sorters are limited to small items. And, the items have to be able to tolerate the drop without being damaged. Additionally, bomb bay sorters have unique benefits when there are space constraints in a facility. These sortation systems can fit into very narrow spaces because sort locations are positioned directly under the sorter track. Designed for automatic sorting of a mix of light-weight items that can be dropped into chutes, shipping parcels, totes, or sacks, Bomb Bay Sorters can accommodate items being manually or automatically inducted onto the sorter. Items can be carried in single trays or across two trays, depending upon their size. A bomb bay sorter is generally less expensive than the crossbelt sorter or the tilt tray sorter. A bomb bay sorter uses split (or quartered), hinged trays to carry items to their sortation destinations. When an item arrives at its intended destination, the two halves of the tray drop open, swinging down and apart (like the bomb bay doors of a military aircraft) and allow the item to drop through and into a container below. Driven by separate drive and sprocket assemblies and powered by a single or dual motor with variable frequency drive, the bomb bay sorter (sometimes referred to as "flat sorter") is quiet and energy efficient. With its simple design and few moving parts, bomb bay sorter, or split tray sorter, is also easy to maintain and provides long term performance.

Sliding shoe sorter is another type of sortation device. Items like poly bags that have inconsistent surfaces are better handled with sliding shoe sorters. Similarly, sorting cartons at high speeds usually requires a sliding shoe sorter. Sliding shoe sorters are more expensive, but they are a better choice for fragile items and can be run at slower speeds if high throughput isn't necessary. Instead of being configured in a loop, a sliding shoe sorter is linear: products enter at the beginning of the line and are diverted before they reach the end of the line. The bed of a sliding shoe sorter is essentially a length of metal slat conveyor with a small rubber clock (called a shoe) mounted on each slat. In most designs, the shoes line up along the side of the conveyor opposite the divert locations. The conveyor carries a carton along the line, and when the carton reaches the carton's divert location, several shoes are activated. The shoes slide across the slats and push the carton off the side off the sorter, usually at a slight angle. The idea is as the shoe slides across the conveyor, it is guiding the carton and changing its orientation at the same time. An alternate design places shoes down the center of the conveyor and pushes cartons in either direction.

There are further kinds of sortation devices. For example, a vertical sorter helps divert products to outlets in different plane (top, middle or low). Usually, a vertical sorter has up to three outputs and can handle flows of heavy cases. A vertical sorter can handle rates of 0 to 60 cases per minute. Another type of sortation device is a split tray sorter whose name stems from the split configuration of the sortation conveyor's doors, which can be opened independently, with each cell being comprised of up to four compartments. A further type of sorter is a flat sorter (sometimes referred to as "bomb bay sorter") whose name is derived from one of the most popular applications for the sortation conveyor, which is the sorting of "flats" such as garments and envelopes. A further type of sorter is a drop tray sorter whose name springs from the action of the carrying tray, which drops open, allowing items to fall into awaiting chutes or containers. A sorter diverter is another kind of device related to sortation that moves the product onto a conveyor. The diverter, which can be an electro-pneumatic or electric device, is activated when detected, pushing it toward the indicated output A sorter diverter typically has a rate of 1 to 40 cases per minute. A sorter diverter can handle products not so regular shapes, not necessarily of flat and rigid bottom. It can handle products from very small and light as CDs, glasses, medicine (here the flow can be handled up to 100 items per minute) to heavy packages and regular sizes.

A key component of most sortation systems is a fixed-position bar code scanner. The scanner identifies each carton or item on the conveyor and sends that information to the sortation system controls. Sortation control systems are typically pre-programmed with the destination of each product and can activate the sortation mechanism when the product arrives at its designated divert point. The smaller the item, the more scanners or sensors is needed to ensure the item is seen. If the product being sorted is particularly valuable, or if there's a question about product movement, sensors can even be put in the chutes themselves to confirm that the item was accurately diverted. As systems have been pushed to continually increase rates, sortation system suppliers have worked to increase throughput without increasing machine speed.

The invention as described herein can be used in conjunction with all kinds of compatible sortation devices, techniques and systems, including those as described above. Accordingly, it is reiterated that the descriptions of the various embodiments of the present invention have been presented for purposes of illustration but are not intended to be exhaustive or limited to the embodiments disclosed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A control system configured for use with sorting articles to a plurality of delivery routes, the control system comprising:

a memory; and a processor, the control system configured for:

sequencing a plurality of delivery stops within each of a plurality of routes based on a predefined criterion;

directing transport of articles associated with a first delivery stop of each route to a first sequence container; and, directing transport of articles from the first sequence container to a respective route container of a plurality of route containers, each route container associated with a route.

2. The system of claim 1, wherein the control system is further configured for directing transport of articles associated with a second delivery stop of each route to a second sequence container.

3. The system of claim 2, wherein the control system is further configured for directing transport of articles from the second sequence container to the respective route container of the plurality of route containers.

4. The system of claim 3, wherein the transport of articles from the second sequence container commencing after completion of the transport of articles from the first sequence container.

5. The system of claim 3, wherein the transport of articles from the second sequence container commences after completion of transport of all articles from the first sequence container.

6. The system of claim 3, wherein at least one of the first sequence container and the second sequence container is positioned proximal a recess provided in a platform.

7. The system of claim 1, wherein the transport is performed by computer-controlled transport vehicles.

8. The system of claim 7, wherein the computer-controlled transport vehicles traverse a platform, wherein the platform includes two lanes for the computer- controlled transport vehicles to traverse therethrough.

9. The system of claim 1, wherein at least one route container of the plurality of route containers comprises one or more of a chute, a gaylord, a receptacle, a gravity conveyor, a bin and a bag.

10. The system of claim 1, wherein a first lane is configured for a computer-controlled transport vehicle to travel proximal a sequence container or a route container, and wherein a second lane is configured for the computer-controlled transport vehicle to divert an article transported by the computer-controlled transport vehicle onto the sequence container or a route container.

11. The system of claim 1, further comprising an induction station wherein an information acquisition device interacts with an identifier associated with a selected article.

12. The system of claim 11, wherein the information acquisition device is configured for imaging a destination address for the selected article, the destination address corresponding to the first delivery stop.

13. The system of claim 12, wherein the imaging is compared with a database comprising a plurality of street addresses associated with a local market.

14. The system of claim 1, wherein the predefined criterion is one or more of: delivery route optimization, delivery vehicle characteristic optimization, delivery vehicle driver work shift optimization, delivery distance optimization, delivery time optimization, delivery route fuel usage optimization, time of day optimization, traffic optimization, network carbon footprint optimization, total network cost optimization, and article condition optimization.

15. The system of claim 1, wherein the control system is further configured for one or more of determining and assigning a delivery stop and a route for each of the articles.

16. The system of claim 1, wherein control system is further configured to:

determine a destination address for an article, and assign a route and a delivery stop on the route for delivery of the article based on the destination address for the article.

17. The system of claim 1, wherein the control system is further configured for directing delivery of the article at the first delivery stop with a delivery vehicle.

18. The system of claim 1, wherein the control system further comprises an article sequencing engine configured for sequencing the plurality of delivery stops within each of the plurality of routes.

19. A control system configured for use with sorting articles to a plurality of delivery routes, the control system comprising:

a memory; and a processor, the control system configured for:

sequencing a plurality of delivery stops within each of a plurality of routes based on a predefined criterion;

directing transport of articles associated with a first delivery stop of each route to a first sequence container; and, directing transport of articles from the first sequence container to a respective route container of a plurality of route containers, each route container associated with a route, wherein the transport is performed by one or more of: a linear sorter and a loop sorter.

20. The system of claim 19, wherein at least one route container of the plurality of route containers comprises one or more of a chute, a gaylord, a receptacle, a gravity conveyor, a bin and a bag.

* * * * *